Figure 1:
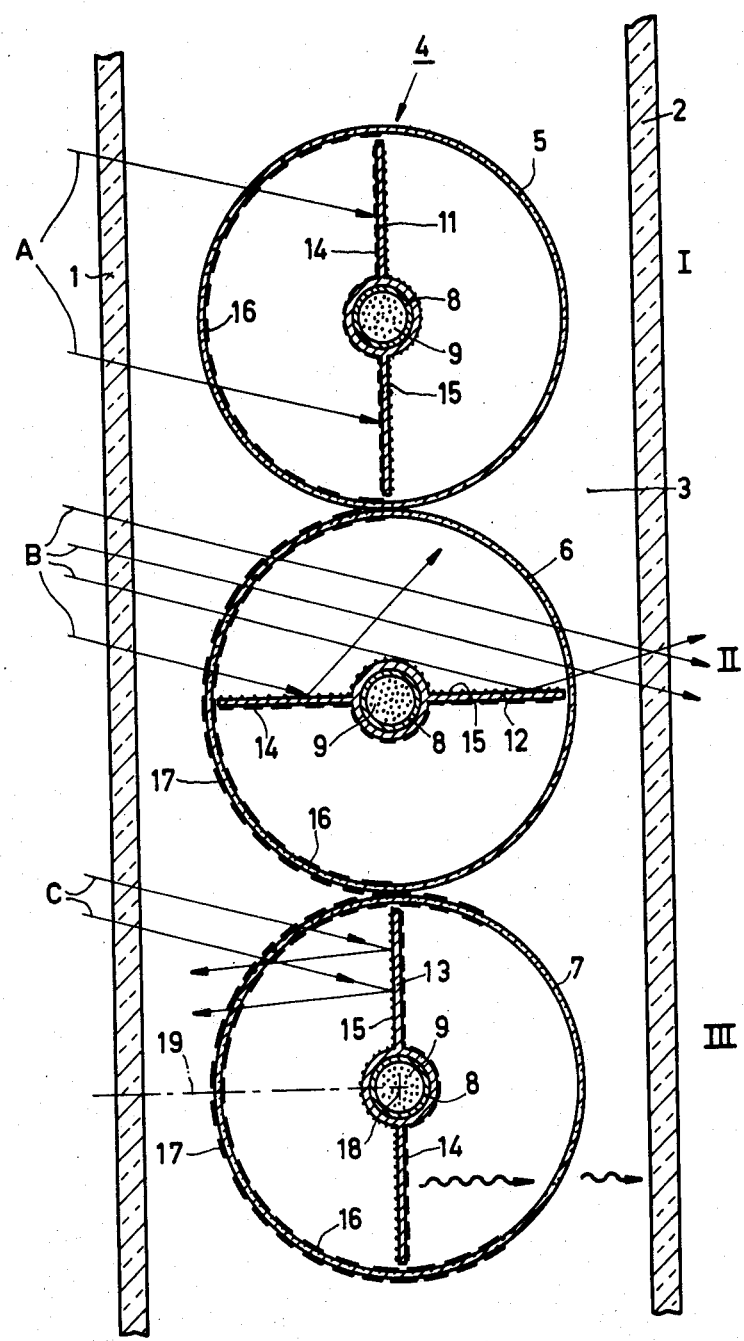

United States Patent [19]

Hörster et al.

[11] 4,284,069
[45] Aug. 18, 1981

[54] WALL ELEMENT COMPRISING A SOLAR COLLECTOR WHICH IS DISPOSED BETWEEN TWO TRANSPARENT PANES

[75] Inventors: Horst Hörster; Wilhelm Hermann, both of Roetgen; Klaus Klinkenberg, Aachen, all of Fed. Rep. of Germany

[73] Assignee: U.S. Philips Corporation, New York, N.Y.

[21] Appl. No.: 66,217

[22] Filed: Aug. 13, 1979

[30] Foreign Application Priority Data

Aug. 21, 1978 [DE]  Fed. Rep. of Germany ....... 2836542

[51] Int. Cl.³ ............................. F24J 3/02; F28F 1/14
[52] U.S. Cl. ................................. 126/438; 126/443; 126/446; 165/183
[58] Field of Search ............... 126/443, 446, 450, 417, 126/424, 425, 438, 439; 165/133, 177, 168, 170, 181, 183, 135, 136

[56] References Cited

U.S. PATENT DOCUMENTS

| | | | |
|---|---|---|---|
| 4,027,653 | 6/1977 | Meckler | 126/438 |
| 4,043,318 | 8/1977 | Pei | 126/443 |
| 4,050,443 | 9/1977 | Peck et al. | 126/432 |
| 4,091,796 | 5/1978 | Bieringer | 126/443 |
| 4,119,085 | 10/1978 | Knowles et al. | 126/443 |
| 4,153,042 | 5/1979 | Tragert | 126/443 |
| 4,156,420 | 5/1979 | Gunderson | 126/443 |

Primary Examiner—Daniel J. O'Connor
Attorney, Agent, or Firm—Thomas A. Briody; William J. Streeter; Rolf E. Schneider

[57] ABSTRACT

A wall element, comprising a solar collector which is arranged between two panes and which comprises a number of rotatable absorber plates. One side of the absorber plates is provided with a non-selective black coating and the other side is provided with a selective, heat-reflective layer. The absorber plates are accommodated in evacuated, transparent tubes.

5 Claims, 2 Drawing Figures

WALL ELEMENT COMPRISING A SOLAR COLLECTOR WHICH IS DISPOSED BETWEEN TWO TRANSPARENT PANES

This invention relates to a wall element, comprising a solar collector which is disposed between two parallel transparent panes and which consists of a number of elongate metal absorber plates each paraxially arranged in an evacuated transparent tube in heat-conductive contact with a tube for a heat energy transport liquid, one surface of each absorber plate being provided with a black coating, whilst the other surface is provided with a layer which reflects sunlight and infrared radiation.

In a wall element of this kind which is known from U.S. Pat. No. 4,014,313, the absorber plates are arranged in a louvered manner at a fixed angle with respect to the horizontal, so that they receive as much sunlight as possible, but the room behind the wall element is substantially completely shielded from direct sunlight thereby. In order to enhance this property, the inner pane of the wall element is provided with a reflective surface. The space between the two transparent panes is evacuated. However, this necessitates the use of very thick panes and/or comparatively small wall element surfaces, since otherwise the panes will be pressed inwards due to the vacuum. Because the outer pane is not provided with a layer, heat losses occur so that this wall element does not provide satisfactory insulation. It operates virtually only as an active solar collector system. This is to be understood to mean a system in which the solar collector converts the radiation energy into thermal energy which is supplied to a heat accumulator, after which the heat energy is discharged to rooms via radiators and the like. This known wall element cannot be switched over to a so-called passive solar heating system.

Passive solar heating systems normally consist of a suitably insulating window and a correspondingly proportioned heat accumulator, for example, the wall of a room.

The radiation energy is then converted into thermal energy directly in the room, so that it can also be used at a low temperature level.

U.S. Pat. No. 3,048,375 describes an active solar collector system where behind a window pane a solar collector is arranged which consists of a number of paraxial absorbers which are arranged to be rotatable around their respective longitudinal axes and which are each constructed to be heat absorbing on one surface and reflective on the other surface. This system can also be used as a passive solar heating system, with a low efficiency, but it is not a substitute for a high-quality insulating wall.

A solar collector comprising a number of paraxial metal absorber plates which are each journalled to be rotatable around a tube for the energy transport liquid and which are respectively accommodated in adjacent, sealed and evacuated transparent glass tubes is known from U.S. Pat. No. 4,027,653. The absorber plates are made of copper and each is provided with an absorption layer on its surface which faces the sun. The absorber plates accommodated in the evacuated tubes are driven either by a permanent magnet coupling or in an electrodynamic manner. This solar collector, however, is not intended as a transparent wall element.

The present invention has for its object to provide a transparent wall element which provides high-quality insulation, which can be used as an active or as a passive solar heating system as desired, and which can also be used as a large-area radiation heating system.

These objects are achieved in accordance with the invention in that the absorber plates are each provided with a non-selective black coating and are rotatable around their respective longitudinal axes in paraxial, adjacent, sealed and evacuated transparent tubes, the inner surface of the longitudinal halves of said tubes which face the outer pane being provided with a selective, heat-reflective layer.

A non-selective black coating has a high absorption factor in the total spectral range of solar light ($\lambda=0.3$ to 2.5 $\mu$m) and a high emission factor in the heat radiation range ($\lambda=2.5$ to 30 $\mu$m). For example, it can consist of graphite, soot, Aquadakt or black enamel.

A selective heat-reflective layer is to be understood to mean a layer which is transparent for sunlight (0.3 to 2 $\mu$m) and reflective for heat radiation (3 to 30 $\mu$m) and which has an emission factor $\epsilon \leq 0.3$ and a reflection factor for heat radiation $R>0.7 (\epsilon=1-R)$. Selective heat-reflective layers of this kind may consist of doped tin dioxide or preferably of tin-doped indium oxide.

By means of this arrangement of selective heat-reflective, non-selective absorbing and non-selective reflective surfaces it is achieved that in the position of the absorber plates parallel to the transparent panes with the non-selective absorbing black coating facing outwards a high efficiency solar collector is obtained. After rotation of the absorber plates through 180°, the non-selective reflective layer faces outwards, and the non-selective absorbing black coating faces inwards. In this position, the wall element has extremely small heat losses to the outside (preferred night position). After connection of the absorber plates to a hot water accumulator, the wall element in this position acts as a large-area radiation heating system to the inside. When the absorber plates occupy a position perpendicular to the transparent panes with their reflective surfaces facing upwards, the wall element allows passage of solar radiation; it acts as a passive solar heating system.

The selective heat-reflective layer on the evacuated tubes allows substantially unimpeded passage of sunlight, but prevents heat radiation to the outside. The heat losses from the inside to the outside, therefore, are very small. In order to improve this effect, the evacuated transparent tubes may also be provided with a selective heat-reflective layer on the outer surface of the longitudinal halves facing the outer pane.

Preferably, each selective heat-reflective layer extends through an angular range of $2 \times 120°$, based on a plane which extends through the tube axis and perpendicularly to the outer pane.

The insulating effect of the wall element can be further improved when, in a further embodiment in accordance with the invention, the space between the two transparent panes is filled with a gas having a poor thermal conductivity, for example, argon, krypton or SF$_6$.

The rotation of the absorber plates accommodated in the evacuated tubes is effectively realized by means of a magnetic coupling, preferably a permanent magnet coupling.

Figure 2:
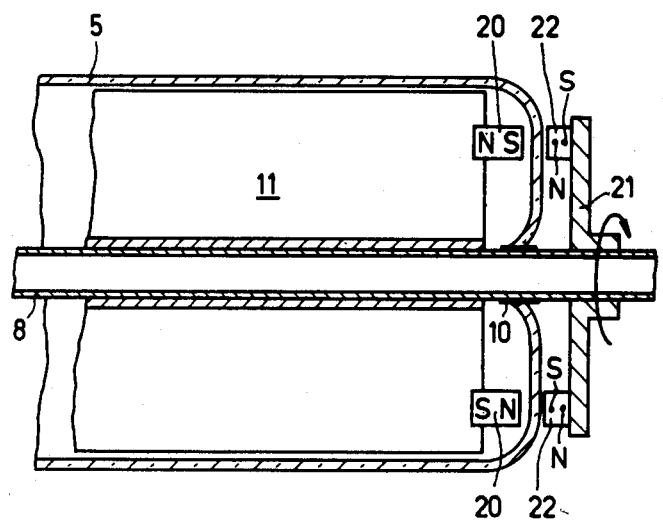

The invention will now be described in detail with reference to the accompanying drawings, in which FIG. 1 is a partial cross-sectional view of a wall element in accordance with the invention, the absorber plates being shown in different positions and the individual evacuated collector tubes being provided with heat-reflective layers deposited in different manners, and FIG. 2 is a longitudinal sectional view of the end of a solar collector tube.

The wall element consists of two panes 1 and 2 which are arranged at a distance from each other and which are made of, for example, glass or a transparent synthetic material, said panes being accommodated in a frame (not shown) in a gas-tight manner, said frame being positioned like a window in an exterior wall or in the roof of a building. The space 3 between the two panes 1 and 2 is filled with a gas having a poor thermal conductivity, for example, argon. Between the two panes 1 and 2 there is arranged a solar collector 4 which comprises a plurality of adjacently arranged glass tubes 5, 6 and 7 which contact each other and the end faces of which are sealed, said glass tubes having been evacuated to a residual gas pressure of less than 1 mbar. A copper tube 8 for heat energy transport liquid 9, for example, water, is centrally passed through each glass tube 5, 6 and 7, said copper tube being connected to the relevant glass tubes 5, 6 and 7 in a vacuum-tight manner by way of known glass-to-metal joints 10. Moreover, in each individual glass tube 5, 6 and 7 an elongate absorber plate 11, 12, 13, respectively, is accommodated, said absorber plates consisting of, for example, extruded aluminium, the center of each being constructed as a hollow tube and the plates being arranged on the relevant copper tubes 8 with a narrow tolerance so that they are in heat-conductive contact with the copper tubes and are rotatable therearound. One surface of the absorber plates 11, 12 and 13 is provided with a non-selective black coating 14, for example, Aquadakt, the other surface being provided with a layer 15 which reflects sunlight and infrared radiation and which is made of, for example, copper, aluminium or silver.

At least the inner surface of the longitudinal halves of the glass tubes 5, 6 and 7 which face the outer pane 1 is provided with a selective, heat-reflective layer 16 of, for example $In_2O_3$ or $SnO_2$. Alternatively, the outer surface of the longitudinal halves of the glass tubes 6 and 7 which face the outer pane 1 is also provided with a selective heat-reflective layer 17. Whilst the heat-reflective layers 16 and 17 of the tubes 5 and 6 extend through an angular range of $2 \times 90°$, based on a plane 19 which extends through the tube axis 18 and perpendicularly to the outer pane 1, the heat-reflective layers 16 and 17 of the glass tube 7 are provided over an angular range of $2 \times 120°$.

FIG. 2 shows permanent magnets 20 arranged at the ends of each absorber plate 11, 12 and 13. Outside each glass tube 5, 6 and 7, permanent magnets 22 are provided on a ring 21 which is rotatable around the copper tube 8, the magnetization of the latter permanent magnets opposing that of the permanent magnets 20. The absorber plates 11, 12 and 13 are rotated synchronously around the copper tubes 8 by rotation of the rings 21 via the permanent magnet couplings thus obtained. The three most essential operating positions are denoted by the references I, II and III in FIG. 1.

In position I, the absorber plate 11 extends parallel to the panes 1 and 2; its non-selective black coating 14 faces outwards. Wall element acts as a high-efficiency solar collector, i.e. the incident sun rays A are absorbed by the non-selective black coating 14 and are converted into heat, which is transferred to heat energy transport liquid 9. The losses are very low. In this position, the wall element can be used as a high-quality heat-insulating wall during the night.

In position II, the absorber plate 12 extends transversely of the panes 1 and 2 and its reflective surface 15 faces upwards. The incident sun rays B then either pass in a non-impeded manner through the panes 1 and 2 and the glass tube 6 or are deflected from the reflective surface 15 in the direction of the room situated behind the pane 2. The wall element then acts as a passive solar heating system with very low heat losses.

In position III, the absorber plate 13 is again parallel to the panes 1 and 2, but its reflective surface 15 is directed outwards. This position is chosen during the daytime, when there is no energy demand. The incident sun rays C are reflected back by the reflective surface 15. During the night, the wall element again acts as a high-quality insulating wall. If heat is desired in the room behind the pane 2, it can be extracted from the heat accumulator and can be supplied via the heat energy transport liquid 9, to the absorber plate 13 where it is radiated inwards without obstruction via the black coating 14. Wall element thus acts as a large-area radiation heating system.

The rotation of the absorber plates 11, 12 and 13 to the three positions I, II and III can be automatically realized by electronic comparison of different sensors. Position I is selected when the desired room temperature is reached, the radiation intensity of the sun is substantially higher ($I > 100$ W/m$^2$) than the loss from the wall element, and free accumulator capacity exists. Position I can also be chosen during the night as a high-quality heat-insulating wall. When heat energy is required in the daytime and generally in the case of low radiation power ($I \leq 100$ W/m$^2$), the solar collector 4 is opened (position II), in which case the reflective surface faces upwards. Position III is selected for the night if heat is required. This is also the case when no heat energy is required in the daytime and the heat accumulator is filled.

What is claimed is

1. A wall element comprising an outer transparent pane and an inner transparent pane parallel to each other and providing an enclosed space therebetween; a number of sealed and evacuated transparent tubes paraxially arranged in said space, adjacent transparent tubes being in contact with each other, the inner surface of the longitudinal half of each transparent tube facing the outer transparent pane being provided with a selective heat-reflective layer; a tube for a heat energy transport liquid arranged axially in each transparent tube in sealed relationship therewith; an elongate metal absorber plate rotatably mounted on each heat energy transport liquid tube in heat-conductive contact therewith, one surface of said absorber plate being provided with a non-selective absorbing layer and the other surface of said absorber plate being provided with a non-selective reflective layer; and means to selectively position the absorber plates (a) with their non-selective absorbing layers parallel to the outer transparent pane to provide an active solar heating system, (b) with their non-selective reflective layers extending transversely of the transparent panes and facing upwardly to provide a passive solar heating system, and (c) with their non-selective reflective surfaces parallel to the outer transparent pane to provide a radiation heating system.

2. A wall element according to claim 1, in which the outer surface of the longitudinal half of each transparent tube facing the outer transparent pane is provided with a selective heat-reflective layer.

3. A wall element according to claim 2, in which the selective heat-reflective layers extend through an angular range of $2\times 90°$ to $2\times 120°$, based on a plane extending through each transparent tube axis transversely to the transparent panes.

4. A wall element according to claim 1, 2 or 3, in which the space between the two transparent panes is filled with a gas having a poor thermal conductivity.

5. A wall element according to claim 1, 2, or 3, in which the selectively positioning means comprises a magnetic coupling.

* * * * *